(12) United States Patent
Saerens et al.

(10) Patent No.: US 11,162,059 B2
(45) Date of Patent: Nov. 2, 2021

(54) **PRODUCTION OF LOW-ALCOHOL OR ALCOHOL-FREE BEER WITH *PICHIA KLUYVERI* YEAST STRAINS**

(71) Applicant: Chr. Hansen A/S, Hoersholm (DK)

(72) Inventors: Sofie Saerens, Skovlunde (DK); Jan Hendrik Swiegers, Fredensborg (DK)

(73) Assignee: CHR. HANSEN A/S, Hoersholm (DK)

( * ) Notice: Subject to any disclaimer, the term of this patent is extended or adjusted under 35 U.S.C. 154(b) by 0 days.

(21) Appl. No.: 16/571,374

(22) Filed: Sep. 16, 2019

(65) Prior Publication Data

US 2020/0080034 A1    Mar. 12, 2020

Related U.S. Application Data

(63) Continuation of application No. 15/413,246, filed on Jan. 23, 2017, now Pat. No. 10,415,007, which is a continuation of application No. 14/773,239, filed as application No. PCT/EP2014/054415 on Mar. 7, 2014, now Pat. No. 9,580,675.

(30) Foreign Application Priority Data

Mar. 7, 2013    (EP) .................................... 13158261

(51) Int. Cl.
*C12C 11/00* (2006.01)
*C12C 12/04* (2006.01)
*C12C 12/00* (2006.01)

(52) U.S. Cl.
CPC ............ *C12C 12/04* (2013.01); *C12C 12/006* (2013.01)

(58) Field of Classification Search
CPC ............................. C12C 12/04; C12C 12/006
See application file for complete search history.

(56) References Cited

U.S. PATENT DOCUMENTS

| | | | |
|---|---|---|---|
| 4,038,420 | A | 7/1977 | Pollock et al. |
| 4,612,196 | A | 9/1986 | Goldstein et al. |
| 6,162,360 | A | 12/2000 | Ho et al. |
| 9,580,675 | B2 | 2/2017 | Saerens et al. |
| 10,415,007 | B2 | 9/2019 | Saerens et al. |
| 2003/0153059 | A1 | 8/2003 | Pilkington et al. |

FOREIGN PATENT DOCUMENTS

| | | |
|---|---|---|
| DE | 747728 C | 10/1944 |
| DE | 288619 A5 | 4/1991 |
| DE | DD288619 A5 | 4/1991 |
| GB | 1 472 578 A | 5/1977 |
| GB | 2 177 112 A | 1/1987 |
| WO | WO-2009/110807 A1 | 9/2009 |
| WO | WO-2010/084018 A1 | 7/2010 |
| WO | WO-2011/003887 A1 | 1/2011 |
| WO | WO-2011/078642 A2 | 6/2011 |
| WO | WO-2011/134952 A1 | 11/2011 |
| WO | WO-2012/066176 A1 | 5/2012 |
| WO | WO-2013/030398 A1 | 3/2013 |

OTHER PUBLICATIONS

Branyik, et al., "A review of methods of low alcohol and alcohol-free beer production", Journal of Food Engineering 108(4): 493-506 (Feb. 2012).
Fabiano Brothers, "Hybrid Beer Style Glossary"; (May 2008), available at https://web.archiv.org/web 20080505231244/http://www.fabianobrothers.com.
International Search Report dated Sep. 11, 2014 issued in PCT/EP2014/054415.
Montanari et al., "Production of Alcohol-Free Beer", in Beer in Health and Disease Prevention, published by Elsevier Inc., Burlington, MA, pp. 61-75, 2009.
N'guessan et al., Identification of yeasts during alcohol fermentation of tchapalo, a traditional sorghum beer from Cote d'Ivoire, Antonie van Leeuwenhoek, 99:855-86 (Feb. 2011).
Saerens et al., "Production and biological function of volatile esters in *Saccharomyces cerevisiae*", Microbial Biotechnology; 3(2):165-77 (Mar. 2010) (available online Apr. 2009).
Stewart, "Wort Glucose, Maltose or Maltotriose—Do Brewer's Yeast Strains Care Which One?", International Centre for Brewing and Distilling, Asia Pacific Section. 31st Asia Pacific Convention, (2010), available at http://www.ibdasiapac.com.au/asia-pacific-activities/convention-proceedings/2010/results.html.
Swiegers et al. "The development of yeast strains as tools to adjust the flavor of fermented beverage to market specifications", Biotechnology in Flavor Production, Blackwell Publishing Ltd., 2008.
USPTO Notice of Allowance issued in U.S. Appl. No. 14/773,239 (US 2016-0010042; now U.S. Pat. No. 9,580,675) dated Oct. 27, 2016.
USPTO Office Action issued in U.S. Appl. No. 14/773,239 (US 2016-0010042; now U.S. Pat. No. 9,580,675) dated Feb. 24, 2016.
Yang et al., "Non-alcoholic Beer Production by *Saccharomycodes ludwigii*", Food Science, 32(15187): 186-190 (Nov. 2011) (Abstract).
Zufall et al. "Process engineering parameters for the dealcoholisation of beer by means of falling film evaporation and its influence on beer quality", Monatsschrift für Brauwissenschaft 53(7/8): 124-137(2000).

(Continued)

*Primary Examiner* — Vera Stulii
(74) *Attorney, Agent, or Firm* — Foley & Lardner LLP

(57) ABSTRACT

It has unexpectedly been found that a low alcohol or alcohol-free beverage, with a flavor profile very close to a beer of at least 4% (vol/vol) alcohol, can be produced by using *Pichia kluyveri* yeast strains. In particular, *Pichia kluyveri* yeast strains only use the glucose in the wort, and have the ability of converting this substrate into a high concentration of specific flavor compounds, which are normally produced by *Saccharomyces* ssp. yeast strains used for the brewing of beer. In this way the *Pichia kluyveri* yeast strains can be used to produce either a low alcohol or alcohol-free beverage, depending on the glucose levels in the wort. The main flavor compounds produced by *Pichia kluyveri* in the fermentation of wort are isoamyl acetate, isoamyl alcohol, ethyl butyrate, ethyl hexanoate and ethyl octanoate.

5 Claims, 6 Drawing Sheets

(56) References Cited

OTHER PUBLICATIONS

Chinese Search Report dated Aug. 1, 2016 in application No. CN 201480012824.9.
Wang, "Research in yeast flora during fermentation of dry red wine in Yantai," China Master's Theses Full-text Database, Engineering Technology I, Issue 10 (Oct. 2011).
Hui, "Research on the Yeast Species Constitute of Grapes from the Main Original Wine Areas in China," A Thesis Submitted for the Application of the Master's Degree of Engineering, (Jun. 2008).
European Search Report dated May 30, 2018 in application No. EP 17206691.2.
USPTO Office Action issued in U.S. Appl. No. 15/413,246 (now U.S. Pat. No. 10,415,007)) dated Jun. 14, 2018.
USPTO Office Action issued in U.S. Appl. No. 15/413,246 (now U.S. Pat. No. 10,415,007) dated Jan. 28, 2019.
USPTO Notice of Allowance issued in U.S. Appl. No. 15/413,246 (now U.S. Pat. No. 10,415,007) dated May 6, 2019.

PRODUCTION OF LOW-ALCOHOL OR ALCOHOL-FREE BEER WITH *PICHIA KLUYVERI* YEAST STRAINS

CROSS-REFERENCE TO RELATED APPLICATIONS

The present application is a continuation of U.S. application Ser. No. 15/413,246, filed Jan. 23, 2017 (now U.S. Pat. No. 10,415,007), which is a continuation of U.S. application Ser. No. 14/773,239, filed Sep. 4, 2015 (now U.S. Pat. No. 9,580,675), which is the U.S. National Stage of International Application PCT/EP2014/054415, filed Mar. 7, 2014, and claims priority to European Patent Application No. 13158261.1 filed Mar. 7, 2013.

FIELD OF THE INVENTION

The present invention relates to the field of preparing a low-alcohol or alcohol-free beverage by fermentation. Specifically, the invention relates to a method of preparing a low-alcohol or alcohol-free beverage with enhanced levels of desirable fermentation-derived flavor compounds comprising a step of fermentation of a wort with a *Pichia kluyveri* yeast strain to obtain a low-alcohol or alcohol-free beverage, a low-alcohol or alcohol-free beverage obtainable by the method and a low-alcohol or alcohol-free beverage comprising a high concentration of specific flavor compounds, such as isoamyl acetate and ethyl octanoate.

BACKGROUND OF THE INVENTION

Due to the increasing demand for healthier food and beverages, the reduction of ethanol in alcoholic beverages, especially beer and wine, is of considerable commercial interest.

Low-alcohol, alcohol-free or reduced-alcohol beers (also called light beer, no-alcohol, non-alcoholic beer, small beer, small ale, near-beer) are beers with no alcohol or a low alcohol content which aim to reproduce the full flavor of standard beers which normally contain more than 4% (vol/vol) alcohol. In most of the EU countries beers with low alcohol content are divided into alcohol-free beers containing no more than 0.5% (vol/vol) alcohol, and into low-alcohol beers with no more than 1.2% (vol/vol) alcohol. In the United States alcohol-free beer means that there is no alcohol present, while the upper limit of 0.5% (vol/vol) alcohol corresponds to so-called non-alcoholic or near-beer (Montanari et al. 2009).

The conversion of wort into an alcoholic beer is the result of a fermentation process by *Saccharomyces* ssp. yeast resulting in the production of alcohol and fermentation-derived 35 flavor compounds, such as esters (e.g. isoamyl acetate) and higher alcohols. Isoamyl acetate is a key flavor compound in beer (Saerens et al. 2010). The combination of the flavor of the raw materials, mostly malt and hops, together with the fermentation process, results in the unique flavor and taste of beers (Swiegers et al. 2007, Saerens et al. 2010).

Today beers with low alcohol contents are often made by producing full-strength beer (with an alcohol concentration of above 4% (vol/vol)) and then removing the alcohol by physical processes (boiling off the alcohol/distillation or reverse osmosis). In the case of some non-alcoholic or alcohol-free beers no fermentation takes place and in some cases the beers are produced by simply diluting full-strength beers with water.

As the physical processes result in the evaporation, loss or dilution of fermentation-derived flavor compounds (or a complete lack of fermentation-derived flavor compounds as in the case with unfermented non-alcoholic or alcohol-free beer), these types of beers are often characterized as being less flavorful than full-strength beer or may have an undesirable wort-like taste (Zufall and Wackerbauer. 2000).

German patent DD 288619 A5 describes the use of *Pichia farinosa* yeast strains to ferment unhopped beer wort to obtain an alcohol-free beverage with fruity aroma.

However, there exists a need for improved methods for preparing a low-alcohol or alcohol-free fermented beverage wherein the presence of desirable flavor compounds, such as esters and higher alcohols, is enhanced.

SUMMARY OF THE INVENTION

The present invention is based on the surprising findings by the inventors that *Pichia kluyveri* yeast strains, only capable of fermenting the glucose in beer wort, is capable of producing high concentrations of desirable flavor compounds with only little ethanol production.

The brewing yeasts of *Saccharomyces pastorianus, Saccharomyces carisbergensis* and *Saccharomyces cerevisiae* utilize both glucose as well as maltose, the main sugars in wort (Boulton and Quain. 2010) resulting in the formation of alcohol and flavor compounds during fermentation. The higher the concentration of wort sugars, the more alcohol and flavor compounds will be produced. In order to produce less alcohol, a solution is to use a yeast that only ferments glucose and not maltose, thereby only producing alcohol from the glucose. Glucose is present in much lower concentrations than maltose in wort (Table 1) and therefore less alcohol will be produced from the same amount of wort compared to when a conventional brewing yeast, e.g. *Saccharomyces pastorianus* or *Saccharomyces carisbergensis,* is used. These types of yeasts exist and examples include certain *Saccharomyces* and non-*Saccharomyces* yeast strains, such as *Saccharomycodes* ssp (Liu et al. 2011).

However, only a relatively small amount of flavor will be produced by these yeast strains from the limited amount of glucose resulting in a beer with lower concentrations of key flavor compounds than beers with more than 4% (vol/vol) alcohol.

TABLE 1

Typical sugar spectrum of wort (Stewart. 2010)
Percent composition

| Glucose | 10-15 |
|---|---|
| Fructose | 1-2 |
| Sucrose | 1-2 |
| Maltose | 50-60 |
| Maltotriose | 15-20 |
| Dextrins | 20-30 |

One way of solving this problem, is to identify a highly aromatic yeast, which is not able to utilize the maltose, in order to produce high concentrations of relevant fermentation-derived flavor compounds from limited amounts of glucose, resulting in similar or higher concentrations of key flavor compounds than when the full fermentation takes place. The inventors of the present invention have found that by using this method and *Pichia kluyveri* yeast strains, it is possible to produce alcohol-free beer and low-alcohol beer (according to EU legislation) with the same flavor as standard, full-strength beers. This is not possible using conventional brewing yeast such as *Saccharomyces cerevisiae* and *Saccharomyces pastorianus* or *Saccharomyces carlsbergensis,* dilution, physical alcohol removal processes or beers produced form non-fermented substrates.

Accordingly, a first aspect of the invention relates to a method of preparing a low-alcohol or alcohol-free beverage comprising the steps of:
  a) providing a wort; and
  b) fermenting the wort with at least one *Pichia kluyveri* yeast strain to obtain a low-alcohol or alcohol-free beverage.

An additional aspect of the present invention relates to a low-alcohol or alcohol-free beverage obtainable by the method according to the first aspect of the invention.

A further aspect of the present invention relates to a low-alcohol or alcohol-free beverage, wherein the low-alcohol or alcohol-free beverage has an isoamyl acetate content of at least 0.5 ppm (mg/L).

An even further aspect of the present invention relates to use of a *Pichia kluyveri* yeast strain for preparing low-alcohol or alcohol-free beverage.

DETAILED DESCRIPTION OF THE INVENTION

Figure 1:
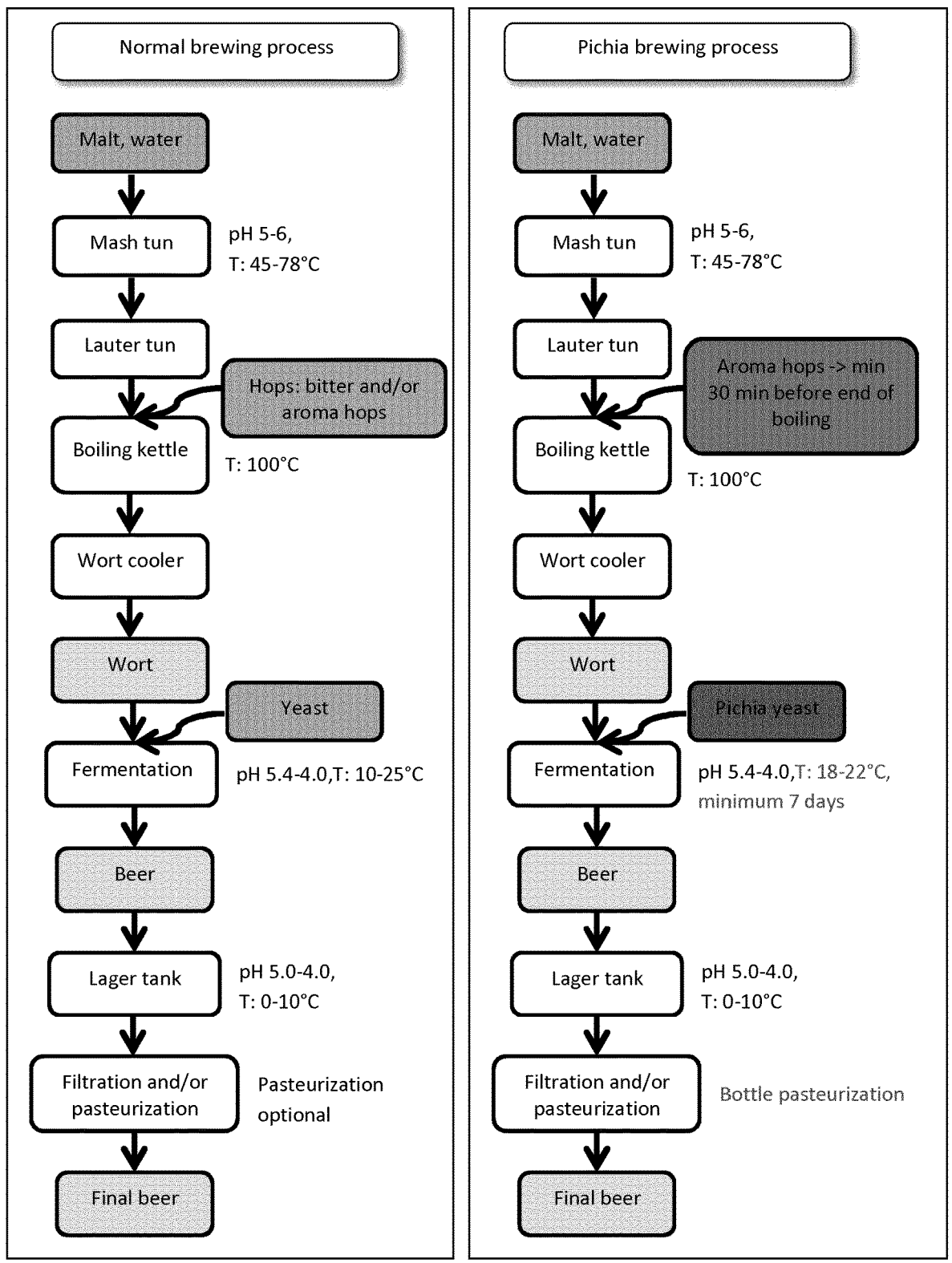
FIG. 1 illustrates an optimized beer brewing process for *Pichia kluyveri* beer. Comparison of the standard (left) versus *Pichia kluyveri* (right) brewing process. Steps that are different from the standard brewing process are highlighted.

The inventors of the present invention have unexpectedly found that *Pichia kluyveri* yeast strains are able to enhance the presence of desirable flavor compounds in beverages prepared by fermenting wort with the *Pichia kluyveri* yeast strains. In particular, it was found that concentrations of flavor compounds desirable for beer, such as isoamyl acetate, isoamyl alcohol and ethyl octanoate, were increased.

Surprisingly, this enhancement of beer flavor compounds is present when yeast strains of the species *Pichia kluyveri* are used in the absence of conventional brewing yeast strains, such as yeast strains of the genera *Saccharomyces* and *Brettanomyces.*

The process of brewing beer is well known to the skilled person and can be outlined in the following way (see FIG. 1); malt is prepared from dried, germinated cereal grains (mainly barley or wheat) and grounded into a grist which may contain unmalted adjuncts. The grist is mashed (mixed with water and steeped) to allow enzymes in the malt to convert the starch into sugars. The grain particles and adjuncts are separated from the liquid wort in a process called lautering. The malt making and mashing steps can be skipped by adding water to malt extract. After addition of hops and/or other ingredients such as herbs and sugars, the wort is boiled (hops may also be added after boiling), cooled and aerated. The wort is then moved to a fermentation tank and fermented by the addition of a brewer's yeast. The primary fermentation, lasting typically 5 to 10 days, may be followed by a secondary fermentation step using a brewer's yeast. After fermentation the fresh beer or "green" beer, is conditioned, optionally filtrated and carbonated. The beer is filled on bottles and optionally pasteurized.

Hops can be added to the wort to balance the sweetness of the malt with bitterness and impart onto the beer desirable flavors and aromas. Several varieties exist including but not limited to Ahtanum, Amarillo, Apollo, Bravo, Calypso, Cascade, Centennial, Chelan, Chinook, Citra, Cluster, Columbus, Comet, Crystal, El Dorado, Eroica, Galena, Glacier, Greenburg, Horizon, Liberty, Millenium, Mount Hood, Mount Rainier, Mosaic, Newport, Nugget, Palisade, San Juan, Santiam, Satus, Simcoe, Sonnet Golding, Sterling, Summit, Super Galena, Tillicum, Tomahawk, Ultra, Vanguard, Warrior, Willamette, Zeus, Admiral, Brewer's Gold, Bramling Cross, Bullion, Challenger, First Gold, Fuggles, Goldings, Herald, Northdown, Northern Brewer, Phoenix, Pilgrim, Pilot, Pioneer, Progress, Target, Whitbread Golding Variety (WGV), Hallertau, Hersbrucker, Saaz, Tettnang, Spalt, Ella, Feux-Coeur Francais, Galaxy, Green Bullet, Hallertau Aroma, Kohatu, Motueka, Nelson Sauvin, Pacific Gem, Pacific Jade, Pacifica, Pride of Ringwood, Rakau, Riwaka, Southern Cross, Sticklebract, Summer, Super Alpha, Super Pride, Topaz, Wai-iti, Hallertau Herkules, Hallertau Magnum, Hallertau Taurus, Magnum, Merkur, Opal, Perle, Saphir, Select, Smaragd, Tradition, Bor, Junga, Lublin, Marynka, Premiant, Sladek, Strisselspalt, Styrian Atlas, Styrian Aurora, Styrian Bobek, Styrian Celeia, Styrian Golding, Sybilla, Tardif de Bourgogne and Sorachi Ace.

The method for preparing a low-alcohol or alcohol-free beverage of the present invention comprises the steps of:
a) providing a wort, and
b) fermenting the wort with at least one *Pichia kluyveri* yeast strain to obtain a low-alcohol or alcohol-free beverage.

The term "low-alcohol beverage" herein is defined as a liquid for drinking with an alcohol content of more than 0.5% (vol/vol) of alcohol and no more than 1.2% (vol/vol) of alcohol.

The term "alcohol-free beverage" herein is defined as a liquid for drinking with an alcohol content of no more than 0.5% (vol/vol) of alcohol.

The term "wort" herein has the conventional meaning in the art and refers to the sugary liquid extracted from the mashing process of beer brewing.

The concentration of glucose in the wort is critical for the resulting alcohol percentage of the beverage and can be adjusted by changing the mashing process, by addition of enzymes and by other methods known to the skilled person.

In a preferred embodiment the wort has a concentration of glucose between 0.01% to 3% (w/vol), such as between 0.5% to 1.0% (w/vol).

Preferably, the fermentation in step b) is carried out under sterile conditions (controlled fermentation) and with *Pichia kluyveri* as the only species of yeast strain added.

The skilled person will readily be able to determine a concentration of inoculation of the *Pichia kluyveri* yeast strain suitable for preparation of a low-alcohol or alcohol-free beverage according to the method.

In a preferred embodiment, the *Pichia kluyveri* yeast strain is inoculated in a concentration of at least $1\times10^4$ CFU/ml (colony-forming units/ml), such as at least $5\times10^4$ CFU/ml, such as at least $1\times10^5$ CFU/ml, such as at least $5\times10^5$ CFU/ml, such as at least $1\times10^6$ CFU/ml, such as at least $5\times10^6$ CFU/ml.

In another preferred embodiment the method further comprises the step a1) adding to the wort at least one hop variety prior to fermenting the wort with the at least one *Pichia kluyveri* yeast strain.

In another preferred embodiment the fermentation of the wort with the at least one *Pichia kluyveri* yeast strain is carried out for at least 7 days, such as for at least 14 days, such as for at least 21 days, such as for at least 28 days.

In another preferred embodiment the fermentation of the wort with the at least one *Pichia kluyveri* yeast strain is carried out at a temperature of between 18° C. and 22° C.

In yet another preferred embodiment the method further comprises the step c) bottling and bottle pasteurizing the low-alcohol or alcohol-free beverage.

Preferably, the at least one *Pichia kluyveri* yeast strain is capable of fermenting glucose but not maltose or maltotriose. This can be tested by growing the yeast strain on a culture medium with only maltose or maltotriose.

In a preferred embodiment the at least one *Pichia kluyveri* yeast strain is selected from the group consisting of the *Pichia kluyveri* PK-KR1 (JT1.28; strain A), that was deposited on 24 Aug. 2006 at the National Measurement Institute, 541-65 Clarke Street, South Melbourne, Victoria 3205, Australia, by University of Auckland, School of Biological Sciences, Auckland 1142, New Zealand, under accession numbers V06/022711, and the *Pichia kluyveri* PK-KR2 (JT3.71), that was deposited on 24 Aug. 2006 at the National Measurement Institute, 541-65 Clarke Street, South Melbourne, Victoria 3205, Australia, by University of Auckland, School of Biological Sciences, Auckland 1142, New Zealand, under accession numbers V06/022712.

Preferably the low-alcohol or alcohol-free beverage is a low-alcohol or alcohol-free beer.

The term "beer" as used herein refers at least to beers prepared from mashes prepared from malted cereals as well as mashes prepared from unmalted cereals, and mashes prepared from a mixture of malted and unmalted cereals. The term "beer" also refers to beers prepared with adjuncts and beers with all possible alcohol contents.

The term "low-alcohol beer" herein refers to a beer with an alcohol content of more than 0.5% and no more than 1.2% (vol/vol) of alcohol.

The term "non-alcohol beer" herein refers to a beer with an alcohol content of no more than 0.5% ABV.

An additional aspect of the present invention relates to a low-alcohol or alcohol-free beverage obtainable by the method described herein.

In a preferred embodiment the low-alcohol or alcohol-free beverage is a low-alcohol or alcohol-free beer.

A further aspect of the present invention is directed to a low-alcohol or alcohol-free beverage, wherein the beverage has an isoamyl acetate concentration of at least 0.5 ppm (parts per million; mg/L), such as at least 0.6 ppm, such as at least 0.7 ppm, such as at least 0.8 ppm, such as at least 0.9 ppm, such as at least 1.0 ppm, such as at least 1.2 ppm, such as at least 1.4 ppm, such as at least 1.6 ppm, such as at least 1.8 ppm, such as at least 2.0 ppm, such as at least 2.5 ppm, such as at least 3.0 ppm, such as at least 3.5 ppm, such as at least 4.0 ppm, such as at least 4.5 ppm, such as at least 5.0 ppm.

Preferably, the low-alcohol or alcohol-free beverage has an ethyl octanoate concentration of at least 10 ppb (parts per billion; pg/L), such as at least 11 ppb, such as at least 12 ppb, such as at least 13 ppb, such as at least 14 ppb, such as at least 15 ppb, such as at least 20 ppb, such as at least 25 ppb, such as at least 30 ppb, such as at least 40 ppb, such as at least 50 ppb, such as at least 60 ppb, such as at least 70 ppb, such as at least 80 ppb, such as at least 90 ppb, such as at least 100 ppb.

In a preferred embodiment the beverage has an alcohol concentration of more than 0.5% (vol/vol) alcohol and no more than 1.2% (vol/vol) alcohol.

In another preferred embodiment the beverage has an alcohol concentration of no more than 0.5% (vol/vol) alcohol.

Preferably, the low-alcohol or alcohol-free beverage is a low-alcohol or alcohol-free beer.

The present invention in one further aspect relates to use of a *Pichia kluyveri* yeast strain for preparing a low-alcohol or alcohol-free beverage.

In a preferred embodiment the low-alcohol or alcohol-free beverage is a low-alcohol or alcohol-free beer.

EXAMPLES

Example 1

Materials and Methods
Fermentation Set-Up
Both low alcohol and alcohol-free beer were produced with 2 different *Pichia kluyveri* strains (strain A and strain B). In total 2 trials have been carried out:
1) Alcohol-free beer with *Pichia kluyveri* strain A and strain B compared to each other.

2) Low alcohol beer with *Pichia kluyveri*, strain A.

The brewing recipe was initially the same for both trials, except for the hop addition. The alcohol-free beer was produced on a 1500 liter scale. The low alcohol beers with *Pichia kluyveri*, strain A and strain B, were produced on a 1000 liter scale. The basis for all the beers was a mixture of 4 different kinds of malt: pilsner malt 20%, wheat malt 38%, Munich malt 38% and Cara 50 malt 4%. The initial sugar concentration was measured to 8.3° Plato with an Anton Paar Beer Alcolyzer.

All yeast strains were inoculated at 5×10$^6$ CFU/ml.

For the alcohol-free beer, with a comparison between strain A and strain B of *Pichia kluyveri*, only hop extract was used for the bitterness. The fermentation was carried out at 20° C. for about three weeks.

For the low alcohol beer, hop extract was used for the bitterness and at the end of wort cooking, Tettnang and Amarillo hops were used as aroma hops. The fermentation was carried out at 21° C. The fermentation was carried out for three weeks, and in the middle of fermentation, Tettnang and Amarillo hops were added as hop bells for dry hopping. The fermentation temperature was lowered to 4° C. in the course of the dry hopping.

After fermentation, all beers were cooled down to 4° C. for several days, filtered and pasteurized. The beer was then filled in bottles.

The initial glucose concentration was >1% in the first trial, but around 0.5% in the last two trials and the glucose concentration decreased very slowly during fermentation. At the end of fermentation, almost all glucose was consumed by the yeast and converted to ethanol.

An overview of the brewing process is given in FIG. 1, where it is compared to a normal brewing process. Important steps in the 'new' brewing process are:
1) Regulating the mashing conditions to optimize the glucose concentration in the wort
2) Assure that the hop added is sterile, so using hop pellets or hop extracts, no dry hopping, as this can result in contamination of the final beer
3) A longer fermentation time to optimize the flavor profile of the beer
4) Bottle pasteurization to avoid the risk of contamination due to the high maltose level in the final beer.

As *Pichia kluyveri* strains are very slow fermenting strains, it is important to keep the wort and the beer sterile. Any addition of hops should be made in a sterile manner, meaning at least 30 min. before the end of boiling of the wort. Dry hopping (addition of hops after boiling) should not be used for the production of low-alcohol or alcohol-free beers, as there is a risk of contaminating the beer. As a lot of sugar is left in the final beer, extra care should be taken to avoid spoilage.

Lab Brewing Trial

Lab-scale fermentation trials were carried out in 500 ml of wort. The wort was prepared with wheat malt extract (Brewferm). The malt extract was mixed with water to reach an initial sugar content of 10° P (Plato) as measured with an Anton Paar Beer Alcolyzer. Amarillo hop pellets were added in a closed coffee filter to the wort and this was boiled for 30 min. to extract the hop flavor and to add bitterness to the beer. Hop pellets were added to reach 23 EBU (European Bitterness Units). After boiling the, the coffee filter was removed from the wort and the wort was transferred to 1 L bottles, which were closed by water locks. Fermentation was carried out at 20° C. After 5 days of fermentation a sample was taken for diacetyl measurement.

Flavor Analysis

Headspace gas chromatography coupled with flame ionization detection (HSGC-FID) is used for the measurement of acetate esters, ethyl esters and higher alcohols in the samples. Samples are analyzed with a calibrated Perkin Elmer GC System with a headspace sampler. The GC is equipped with a HP-FFAP column (25 m×0.20 mm×0.33 µm, Agilent Technologies, Germany). The split-splitless injector is used and held at 180° C. Samples are heated for 30 min. at 70° C. in the headspace autosampler before injection (needle temperature: 110° C.). Helium is used as the carrier gas. The SOF-program works as follows: after starting at 60° C., the oven temperature is raised after 2 min. from 60° C. to 230° C. at 45° C./min and is finally held at 230° C. for 5 min. During the GC-program a constant flow rate (10 mL/min) of the carrier gas (He) is maintained. The FID temperature is kept constant at 220° C. The results are analyzed with Turbochrom software. Headspace GC-MS was used for the analysis of diacetyl. In principal, this method is the same as the method used to detect flavor compounds, but an extra split transports additional helium, leading to an increased flow rate and resulting in a higher concentration of the compound on the column. Further differences were that the pressurized vial acts for 0.03 min. as a carrier gas reservoir and the GC program starts at a temperature of 90° C.

Ethanol and Density Analysis

Ethanol and density analysis was performed with an alcolyzer beer analyzing system from Anton-Paar.

Results

TABLE 2

Concentrations (in ppm; mg/L) of ethyl butyrate, isoamyl acetate, isoamyl alcohol, ethyl hexanoate and ethyl octanoate in 6 commercial beers and beer prepared with *Pichia kluyveri* strain A and *Pichia kluyveri* strain B.

| | Ethyl butyrate | Isoamyl acetate | Isoamyl alcohol | Ethyl hexanoate | Ethyl octanoate |
|---|---|---|---|---|---|
| Carlsberg | 1.10 | 1.00 | 34.0 | 0.04 | 0.10 |
| Stella | 2.14 | 0.71 | 50.0 | 0.11 | 0.10 |
| Heineken | 2.02 | 4.87 | 46.0 | 0.10 | 0.09 |
| 3 horses | 0.00 | 0.00 | 0.0 | 0.00 | 0.00 |
| *Hollandia* | 0.00 | 0.26 | 3.2 | 0.00 | 0.00 |
| *Bavaria* | 0.00 | 0.18 | 2.0 | 0.00 | 0.00 |
| Malt beer | 0.71 | 0.21 | 11 | 0.01 | 0.01 |
| *Pichia* A - alcohol-free | 0.43 | 1.96 | 2.00 | 0.03 | 0.12 |
| *Pichia* B - alcohol-free | 0.26 | 4.94 | 2.00 | 0.07 | 0.13 |
| *Pichia* A - low alcohol | 0.27 | 2.50 | 1.80 | 0.02 | 0.13 |

Alcohol-Free Beer Produced by the Use of *Pichia kluyveri* During Fermentation

To produce an alcohol-free beer, a brewing process with *Pichia kluyveri* yeast strains was carried out (see Materials and methods). The *Pichia kluyveri* strains were used to produce a beer with an alcohol percentage less than 0.5%. In European terms, this is considered a non-alcoholic beer. This brewing trial was performed in a 1000 liter scale, with *Pichia kluyveri* strain A and strain B and a slightly lower fermentation temperature of 20° C. (see FIG. 1 for brewing process details). All the glucose was consumed at the end of fermentation and the beer produced with strain A had an alcohol percentage of 0.1%. The beer produced with strain B had an alcohol percentage of 0.2%. The fermentation time was three weeks.

The two final beers were used for flavor analysis. In order to have an idea of the flavor profile of commercial alcohol-free beers, 4 commercial alcohol-free beers were included in the flavor analysis. The 3 beers were 3 horses, Hollandia and Bavaria. The following ingredients were mentioned on the beers:

3 horses classic non-alcoholic beer: water, barley, malt, maize and hops.
Hollandia malt non-alcoholic beer: water, barley, malt, maltose and hop extract.
Bavaria non-alcoholic beer: pure mineral water, barley malt, maltose and hops.

As control, the flavor profile of a Carlsberg pilsner beer (4.6% (vol/vol) alcohol) was used. To compare the trial beers brewed with *Pichia kluyveri* with other commercial pilsner beers, the flavor profile of 2 other pilsner beers was measured: Stella premium lager beer (5.2% (vol/vol) alcohol) and Heineken lager beer (5.0% (vol/vol) alcohol).

As can be seen from the list above, the main ingredients for the alcohol-free beers are water, malt (sometimes with unmalted barley as adjunct) and hops. These are the same main ingredients as in the trials with *Pichia kluyveri*.

Figure 2:
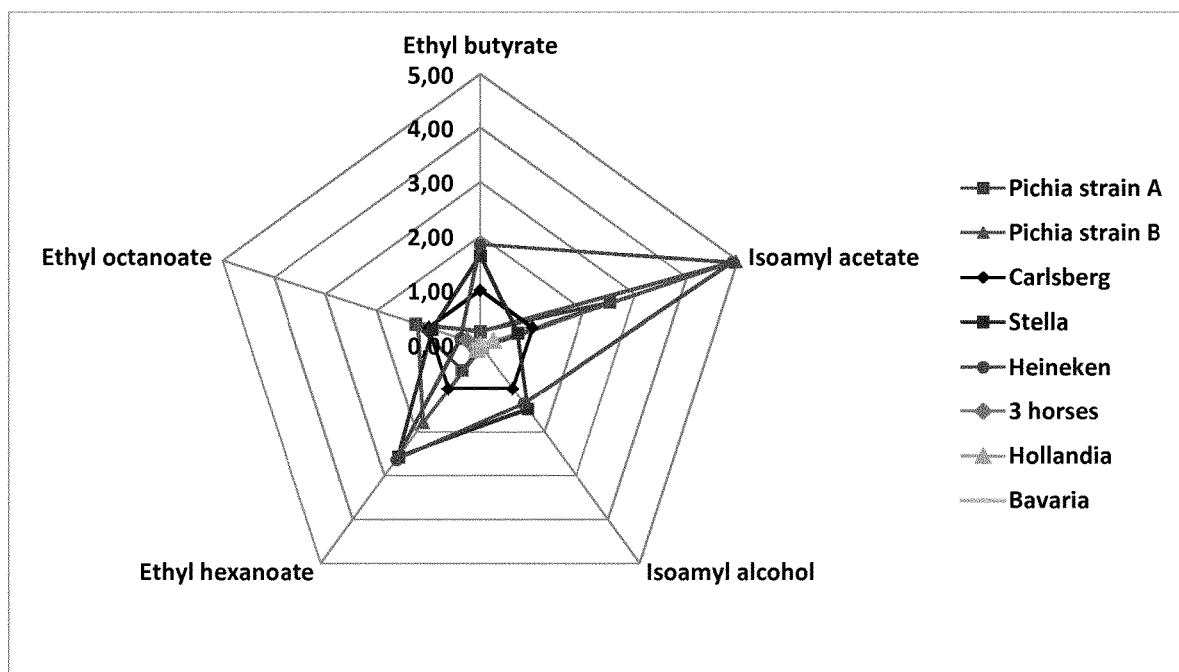
FIG. 2 illustrates the flavor profile comparison of 5 different alcohol-free beers: 3 horses. Hollandia, Bavaria (all with 0% alcohol) and the beers produced with *Pichia kluyveri* strain A (0.1% (vol/vol) alcohol) and strain B (0.2% (vol/vol) alcohol). Carlsberg pilsner beer with 4.6% (vol/vol) alcohol was used as a reference pilsner beer and two other pilsner beers are shown as well: Stella (5.2% (vol/vol) alcohol) and Heineken (5.0% (vol/vol) alcohol). 5 different flavor compounds were measured with headspace-GC-FID: isoamyl acetate, isoamyl alcohol, ethyl butyrate, ethyl hexanoate and ethyl octanoate. The flavor compound concentrations in Carlsberg pilsner beer were used as a reference and were scaled to be 1. The flavor concentrations in all beers were put on the same scale in order to be able to compare the values.

The result of the flavor analysis is depicted in FIG. 2. The concentrations of the 5 flavor compounds isoamyl acetate, isoamyl alcohol, ethyl butyrate, ethyl hexanoate and ethyl octanoate are shown, each scaled so that the concentration of the respective flavor compound for the Carlsberg pilsner beer is 1.

FIG. 2 clearly shows that all the commercial alcohol-free beers have a very low concentration of typical beer flavor compounds, when compared to the Carlsberg pilsner beer and compare to the other three pilsner beers. However, the beer produced with *Pichia kluyveri* has similar levels of specific beer flavor compounds as the reference pilsner beer, in particular isoamyl alcohol, ethyl hexanoate and ethyl octanoate. Ethyl butyrate was present in lower amount (half the concentration) and isoamyl acetate was present in higher amounts (double or more concentration). When compared to the other pilsner beers, it seems that the isoamyl acetate concentration in the *Pichia kluyveri* beer is still higher, as well as ethyl octanoate concentrations. However, ethyl butyrate and ethyl hexanoate concentrations were higher in the pilsner beers than in the *Pichia kluyveri* beer. These compounds are present in very low concentrations in beer and are less important compared to isoamyl acetate concentrations. Isoamyl alcohol concentrations does not differ much between the *Pichia kluyveri* beer and the pilsner beers, but was virtually absent in the alcohol-free beers. When the overall flavor profile of the *Pichia kluyveri* beer is compared to to the alcohol-free and pilsner beers, it seems that the flavor profile of the *Pichia kluyveri* beer is closer to a beer with 4.6-5.2% (vol/vol) alcohol than the flavor profile of any of the commercial alcohol-free beers measured.

As these flavor compounds have a similar fruity flavor, they work in synergy. Tasting of the *Pichia kluyveri* beer revealed that the flavor was very beer-like and this beer was preferred over the commercial alcohol-free beers by a tasting panel consisting of brewers and beer consumers.

Low-Alcohol Beer Produced with *Pichia kluyveri*

This beer was brewed from 1500 liter wort and the fermentation temperature was 21° C. (see FIG. 1 for brewing process details). This trial was carried out with *Pichia kluyveri* strain A. All the glucose was consumed at the end of fermentation and the final ethanol level was 0.7%. The fermentation time was three weeks.

Figure 3:
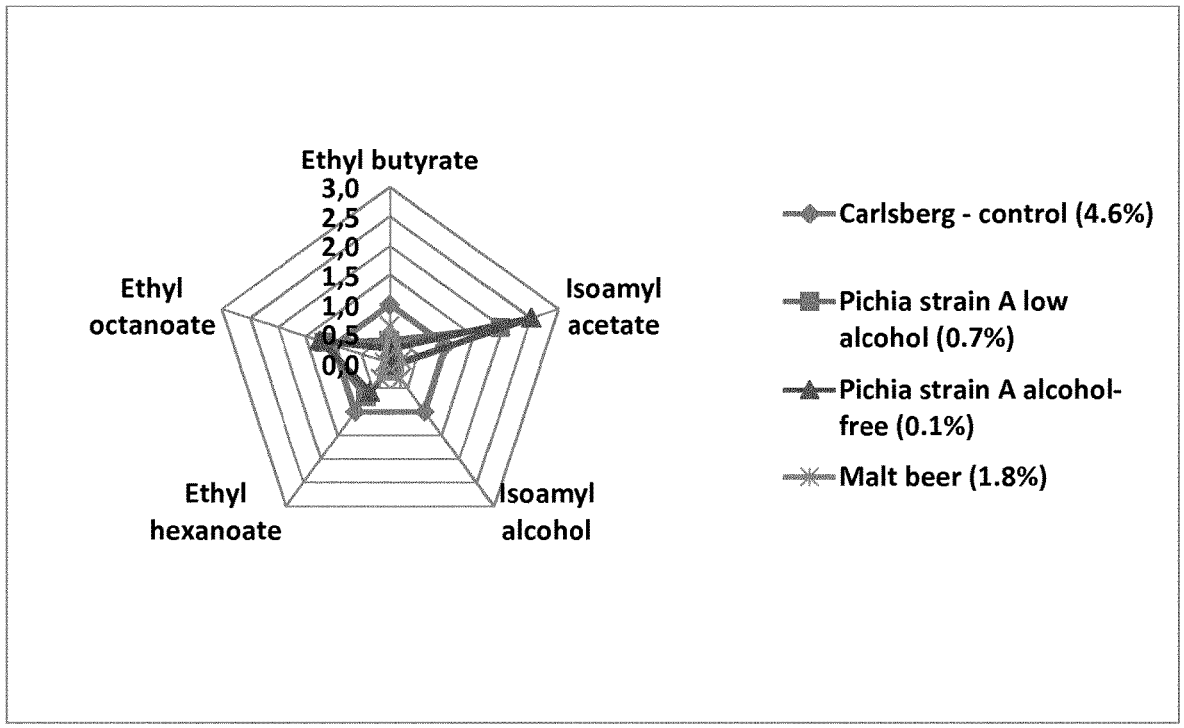
FIG. 3 shows flavor profile comparison of 4 different beers: alcohol-free beer with *Pichia kluyveri* strain A (0.1% (vol/vol) alcohol), low alcohol beer with *Pichia kluyveri* strain A (0.7% (vol/vol) alcohol), Carlsberg pilsner beer (4.6% (vol/vol) alcohol) which was used as a reference pilsner beer (control) and malt beer (1.8% (vol/vol) alcohol). 5 different flavor compounds were measured with headspace-GC-FID: isoamyl acetate, isoamyl alcohol, ethyl butyrate, ethyl hexanoate and ethyl octanoate. The flavor compound concentrations in Carlsberg pilsner beer were used as a reference and were scaled to be 1. The flavor concentrations in the 3 beers were put on the same scale in order to be able to compare the values.

As can be seen from FIG. 3, both the alcohol-free and low-alcohol beer prepared with *Pichia kluyveri* strain A have a similar flavor profile, meaning that both the alcohol-free and low-alcohol beer are very close to a normal pilsner beer flavor profile. Again the main esters isoamyl acetate, ethyl butyrate, ethyl hexanoate, ethyl octanoate and isamyl alcohol determine the flavor profile.

Measurement of Diacetyl Produced by *Pichia kluyveri*

Figure 4:
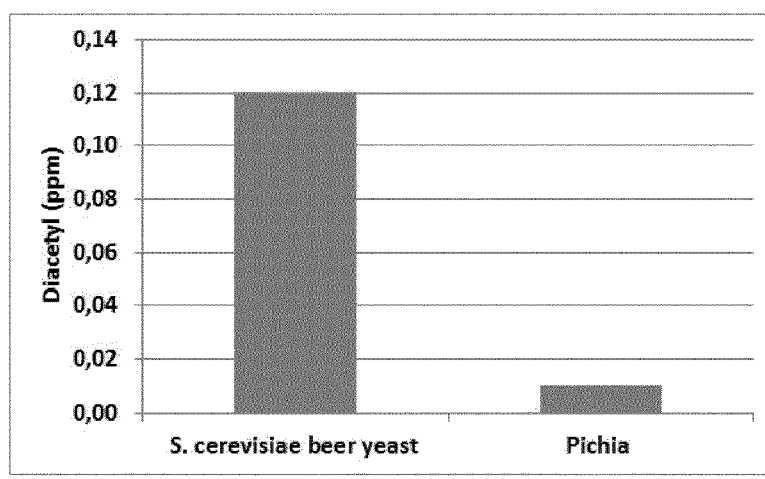
FIG. 4 illustrates the diacetyl concentrations in beer trials with *Pichia kluyveri* strain A and a *Saccharomyces cerevisiae* beer yeast.

To be sure that *Pichia kluyveri* does not produce any significant off-flavors in beer, the production of the most important off-flavor in beer, diacetyl, was measured in a lab brewing trial with *Pichia kluyveri* strain A only, compared to a beer with a *Saccharomyces cerevisiae* beer strain (FIG. 4).

It is clear from FIG. 4 that *Pichia kluyveri* produces much less diacetyl compared to a *Saccharomyces cerevisiae* brewing strain. This is important as diacetyl is often regarded as an off-flavor in beer. Especially, in alcohol-free and low-alcohol beers where no alcohol is present, the taste threshold level of diacetyl is probably much lower than in normal strength beers.

Conclusion

The flavor profile results of the alcohol-free and low-alcohol beers produced with *Pichia kluyveri* show that this yeast strain is ideally suited for the production of beers with lower or no alcohol. Especially, the production of a high amount of esters, coming from a very low glucose concentration is a special property seen in *Pichia kluyveri* strains. Together with isoamyl acetate, other esters are enhanced, which gives the beers with low or no alcohol a beer-like flavor profile.

Example 2

*Saccharomycodes ludwigii* has been mentioned in Branyik et al. (2012) as the most successful genus, other than *Saccharomyces*, used for the industrial production of alcohol-free beer.

To compare the properties of *Pichia kluyveri* with the properties of *Saccharomycodes ludwigii* for preparation of low-alcohol beer a second experiment was set up:

Materials and Methods
Culturing Yeast

The two yeast cultures (*Pichia kluyveri* strain A and a *Saccharomycodes ludwigii* yeast strain) were prepared in YPD (2% glucose, 1% peptone and 0.5% yeast extract), with an adjusted pH of 5.5. The YPD medium was autoclaved at 121° C. for 20 minutes.

The yeast cultures were plated out on YGC plates (Sigma-Aldrich) and a single colony was inoculated in 5 ml YPD medium. These cultures were grown overnight in a shaking incubator at 30° C. and inoculated in 500 ml YPD. After 2 days, a sample was taken for cell counts to be able to inoculate the yeast cultures at the same initial cell count in the wort medium.

Lab Brewing Trial

Lab-scale fermentation trials were carried out in 500 ml of wort. The wort was prepared with pilsner malt extract (Brewferm). The malt extract was mixed with water to reach an initial sugar content of 7° P (Plato) as measured with an Anton Paar Beer Alcolyzer. In total, 10 liter wort was prepared in this way.

In the first set-up, the wort was boiled for 60 minutes without addition of hops. In the second set-up, 4.5 g of Amarillo, 4.5 g of Cascade and 2 g of Tettnanger hop pellets were added to the wort and boiled for 60 minutes to give bitterness. 10 minutes before the end of boiling, 1.5 g Cascade, 1.5 g Amarillo and 1 g Tettnanger hop pellets were added as aroma hops. After boiling, the wort was transferred to 2 L bottles (1600 ml of wort per bottle), which were closed by water locks.

The yeast cultures were inoculated at 1×10⁶ CFU/ml and fermentation was carried out at 20° C. After 5 days of fermentation, a sample was taken for flavor analysis.

Ethanol Analysis

Ethanol was measured with the Ethanol Enzymatic Bioanalysis kit of Boehringer Mannheim.

Flavor Analysis

Flavor analysis was carried out at Laboratorio de Analisis del Aroma y Enologia (Zaragoza, Spain). Minor aroma compounds are expressed in µg/L (ppb) and are measured with solid-phase extraction and Gas chromatography with mass spectrometric detection, while major aroma compounds are expressed in mg/L (ppm) and are measured with gas chromatographic-flame ionization detection after extracting the compounds in dichloromethane.

Results

Lab-scale fermentations were carried out in two types of pilsner wort: wort without the addition of hops and the same pilsner wort with addition of bitter and aroma hops (Cascade, Amarillo and Tettnanger) (see materials and methods). Two different yeast strains were tested: *Saccharomycodes ludwigii* and *Pichia kluyveri*. The yeast cultures were inoculated at a cell count of 1E6 CFU/ml after culturing them in YPD medium. In total, 4 different fermentations were carried out:

1) *Saccharomycodes ludwigii* in wort without hops (*S. ludwigii* w/o hops)
2) *Saccharomycodes ludwigii* in wort with hops (*S. ludwigii* with hops)
3) *Pichia kluyveri* in wort without hops (*P. kluyveri* w/o hops)
4) *Pichia kluyveri* in wort with hops (*P. kluyveri* with hops)

All fermentations were carried out for 5 days at 20° C.

Figure 5:
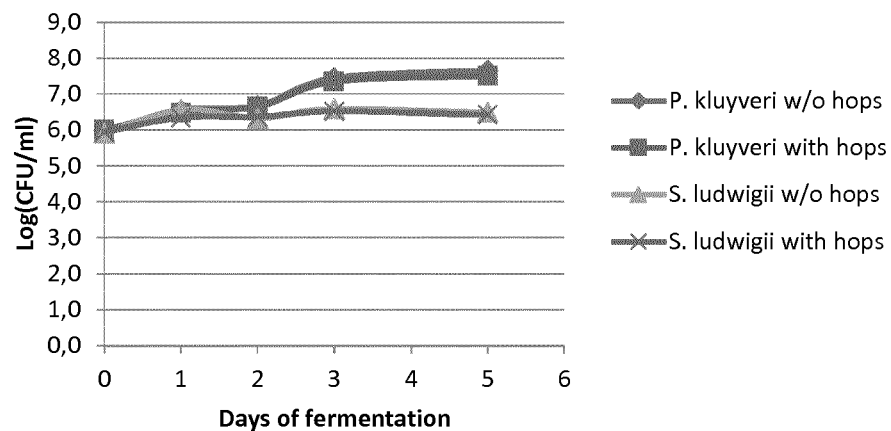
FIG. 5 depicts yeast cell growth during fermentation.

During the fermentation, cell counts were measured every day to follow yeast growth (FIG. 5).

It is clear from FIG. 5 that both yeast strains survived in the wort with and without hops. *Pichia kluyveri* is clearly growing, compared to *Saccharomycodes ludwigii*, which has a stable cell count during the whole fermentation.

After 5 days, ethanol concentration was measured in all fermentation products (Table 3).

TABLE 3

Ethanol concentration in all 4 fermentation products

| Fermentation product | Ethanol %/v/v |
|---|---|
| *S. ludwigii* w/o hops | 0.3 |
| *C. ludwigii* with hops | 0.3 |
| *P. kluyveri* w/o hops | 0.1 |
| *P. kluyveri* with hops | 0.1 |

Table 3 shows that both *Saccharomycodes ludwigii* and *Pichia kluyveri* produce very low amounts of ethanol. *Pichia kluyveri* seems better at producing no alcohol, as this strain grows to higher cell counts, but produces less alcohol, compared to *Saccharomycodes ludwigii*.

The fermentation products at day 5 were also analyzed for flavor profile (FIGS. 6, 7, 8 and 9). The most important flavor compounds for beer are esters and higher alcohols.

Figure 6:
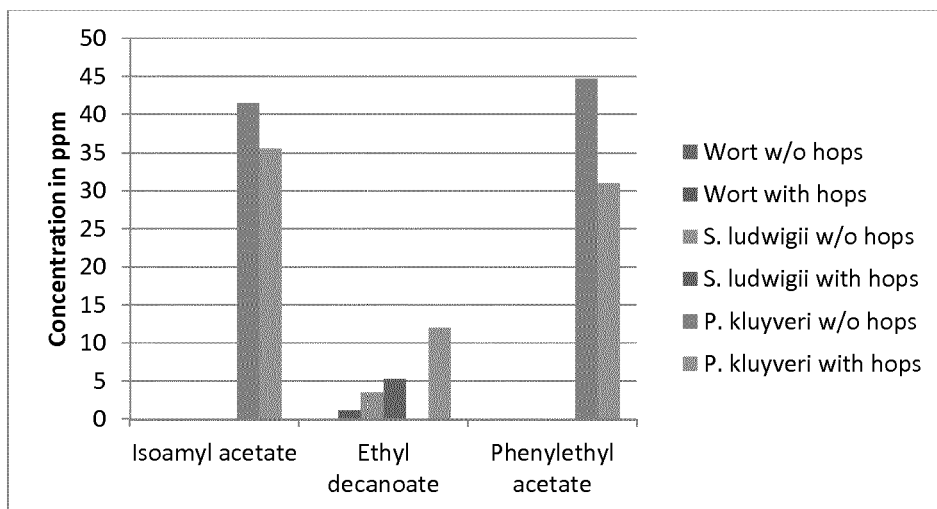
FIG. 6 shows isoamyl acetate ethyl decanoate and phenylethyl acetate concentrations in all fermentation products with *Saccharomycodes ludwigii* and *Pichia kluyveri,* as well as in the basic wort (with and without hops). w/o=without.
Figure 7:
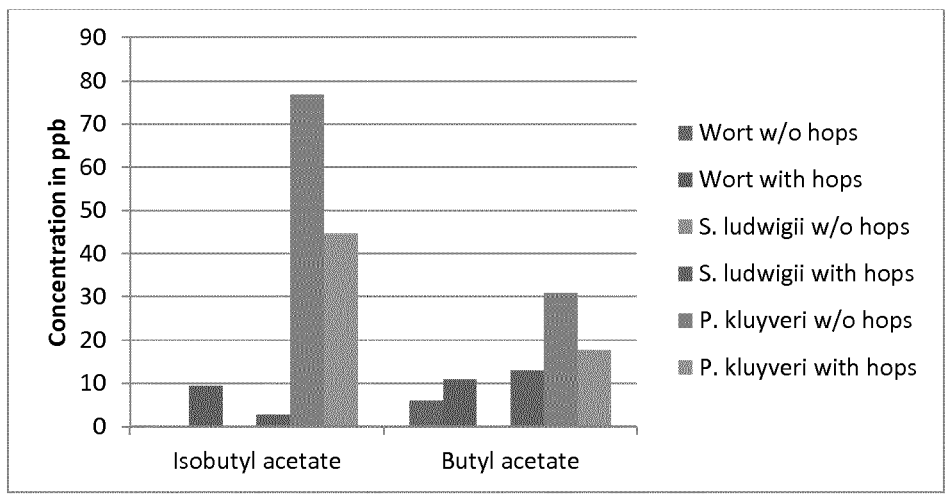
FIG. 7 illustrates isobutyl acetate and butyl acetate concentrations in all fermentation products with *Saccharomycodes ludwigii* and *Pichia kluyveri,* as well as in the basic wort (with and without hops). w/o=without.

FIGS. 6 and 7 show the ester concentrations in all final fermentation products, as well as in the basic wort with and without hops. All ester concentrations are the highest in the fermentation products with *Pichia kluyveri*, both with and without hops. In the case of isoamyl, phenylethyl, isobutyl and butyl acetate, *Pichia kluyveri* produces higher amounts of these esters when no hops are added, compared to ethyl decanoate. Especially the levels of isoamyl acetate and phenylethyl acetate are very high. Isoamyl acetate results in a banana aroma, while phenylethyl acetate results in a more flowery, honey aroma. Both ester compounds are wanted compounds in beer. It has to be noted that the results depicted here are ester concentrations after 5 days of fermentation, and these concentrations will decrease over time in a final beer. It is important to have high ester concentrations to start with, resulting in a fruity beer for a longer period of time, as these ester compounds are hydrolyzed over time in the final beer.

Figure 8:
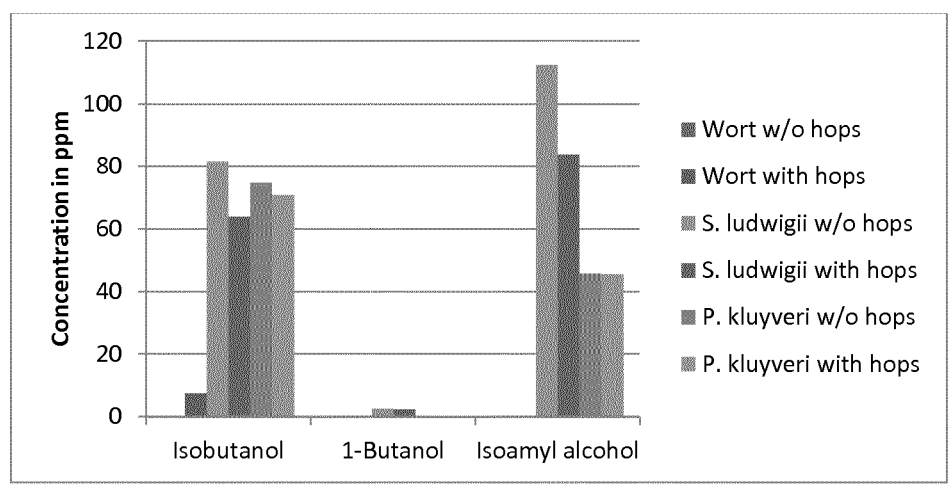
FIG. 8 shows isobutanol, 1-butanol and isoamyl alcohol concentrations in all fermentation products with *Saccharomycodes ludwigii* and *Pichia kluyveri,* as well as in the basic wort (with and without hops). w/o=without.

The fusel alcohol concentrations, depicted in FIG. 8, are quite similar between the fermentation products of *Saccharomycodes ludwigii* and *Pichia kluyveri*. Only isoamyl alcohol concentrations are higher in the fermentation products with *Saccharomycodes ludwigii*, probably because this compound is not converted to isoamyl acetate, as is the case in the *Pichia kluyveri* fermentation products.

Figure 9:
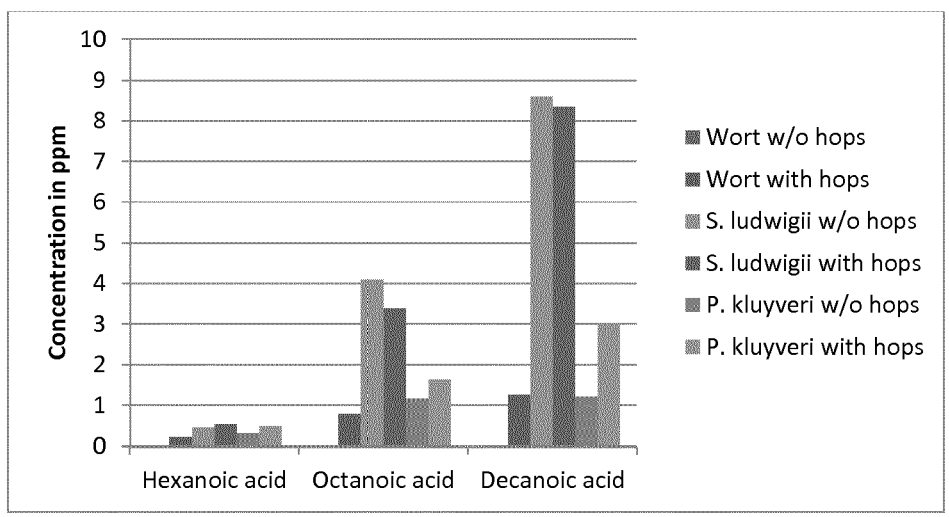
FIG. 9 depicts hexanoic, octanoic and decanoic acid concentrations in all fermentation products with *Saccharomycodes ludwigii* and *Pichia kluyveri,* as well as in the basic wort (with and without hops). w/o=without.

In FIG. 9, three acids are depicted, which are negative flavor compounds in beer. Especially decanoic acid gives a rancid, cheesy flavor to beer and is therefore unwanted. It is very clear that especially *Saccharomycodes ludwigii* is producing high amounts of these acids, making it less suitable for beer production.

Conclusion

The lab brewing trial with the two different non-*Saccharomyces* yeast strains clearly indicates that *Pichia kluyveri* is better suited for the production of alcohol-free beer, compared to *Saccharomycodes ludwigii*. *Pichia kluyveri* produces less alcohol, more wanted ester compounds and less unwanted acids, compared to *Saccharomycodes ludwigii*.

Deposits

The *Pichia kluyveri* PK-KR1 (JT1.28 or strain A) and PK-KR2 (JT3.71) strains were deposited on 24 Aug. 2006 at the National Measurement Institute, 51-65 Clarke Street, South Melbourne, Victoria 3205, Australia, by University of Auckland, School of Biological Sciences, Auckland 1142, New Zealand, and given the accession numbers V06/022711 and V06/022712 as described in WO 2009/110807.

REFERENCES

DD 288619
WO 2009/110807
Boulton, C. M. and Quain, D. 2010. Brewing yeast and fermentation. Blackwell publishing Ltd.
Branyik, T, Silva, D. P., Baszczyn, M., Lehnert, R., Almeida e Silva, J. B., 2012. A review of methods of low alcohol and alcohol-free beer production. Journal of Food Engineering 108,493-506.
Liu, Y., Li, H., Du, J.-H. 2011. Non-alcoholic Beer Production by *Saccharomycodes ludwigii*. Food Science, 32: 186-190.
Montanari, L., Marconi, O., Mayer, H., Fantozzi, P., 2009. Production of alcohol-free beer. In: Preedy, V. R. (Ed.), Beer in Health and Disease Prevention. Elsevier Inc., Burlington, Mass., 61-75.
Saerens S. M., Delvaux F. R., Verstrepen K. J., Thevelein J. M. 2010. Production and biological function of volatile esters in *Saccharomyces cerevisiae*. Microbial Biotechnology 3:165-77.
Stewart, G. Wort glucose, maltose or maltotriose—do brewer's yeast strains care which one? Institute of Brewing and Distilling. Asia Pacific Section. 31st Asia Pacific Convention 2010. (http://www.ibdasiapac.com.au/asia-pacific-activities/convention-proceedings/2010/results.html)

Swiegers, J. H., S. M. G. Saerens, I. S. Pretorius. 2007. The development of yeast strains as tools to adjust the flavor of fermented beverage to market specifications. Havkin D. and Belanger F. Biotechnology in flavor production. Blackwell Publishing Ltd.

Zufall C, and Wackerbauer K. 2000. Process engineering parameters for the dealcoholisation of beer by means of falling film evaporation and its influence on beer quality. Monatsschrift fur Brauwissenschaft 53:124-137.

The invention claimed is:

1. A hopped low-alcohol or alcohol-free beer, wherein the beer has an alcohol content of no more than 1.2% (vol/vol) and an isoamyl acetate content of at least 0.5 ppm (mg/L), and comprises water, fermented wort, hop, and *Pichia kluyveri*, wherein *Pichia kluyveri* is the only species of yeast present in the beer.

2. A hopped low-alcohol or alcohol-free beer according to claim 1, having an alcohol content of no more than 0.5%.

3. A hopped low-alcohol or alcohol-free beer according to claim 1, wherein the *Pichia kluyveri* is selected from *Pichia kluyveri* strain PK-KR1 having accession number V06/022711 and *Pichia kluyveri* strain PK-KR2 having accession number V06/022712.

4. A hopped low-alcohol or alcohol-free beer according to claim 1, wherein the beer has an ethyl octanoate concentration of at least 10 µg/L.

5. A hopped low-alcohol or alcohol-free beer according to claim 1, wherein the hop is selected from Ahtanum, Amarillo, Apollo, Bravo, Calypso, Cascade, Centennial, Chelan, Chinook, Citra, Cluster, Columbus, Comet, Crystal, El Dorado, Eroica, Galena, Glacier, Greenburg, Horizon, Liberty, Millenium, Mount Hood, Mount Rainier, Mosaic, Newport, Nugget, Palisade, San Juan, Santiam, Satus, Simcoe, Sonnet Golding,Sterling, Summit, Super Galena, Tillicum, Tomahawk, Ultra, Vanguard, Warrior, Willamette, Zeus, Admiral, Brewer's Gold, Bramling Cross, Bullion, Challenger, First Gold, Fuggles, Goldings, Herald, Northdown, Northern Brewer, Phoenix, Pilgrim, Pilot, Pioneer, Progress, Target, Whitbread Golding Variety (WGV), Hallertau, Hersbrucker, Saaz, Tettnang, Spalt, Ella, Feux-Coeur Francais, Galaxy, Green Bullet, Hallertau Aroma, Kohatu, Motueka, Nelson Sauvin, Pacific Gem, Pacific Jade, Pacifica, Pride of Ringwood, Rakau, Riwaka, Southern Cross, Sticklebract, Summer, Super Alpha, Super Pride, Topaz, Wai-iti, Hallertau Herkules, Hallertau Magnum, Hallertau Taurus, Magnum, Merkur, Opal, Perle, Saphir, Select, Smaragd, Tradition, Bar, Junga, Lublin, Marynka, Premiant, Sladek, Strisselspalt, Styrian Atlas, Styrian Aurora, Styrian Bobek, Styrian Celeia, Styrian Golding, Sybilla, Tardif de Bourgogne, and Sorachi Ace.

* * * * *